Figure 1:
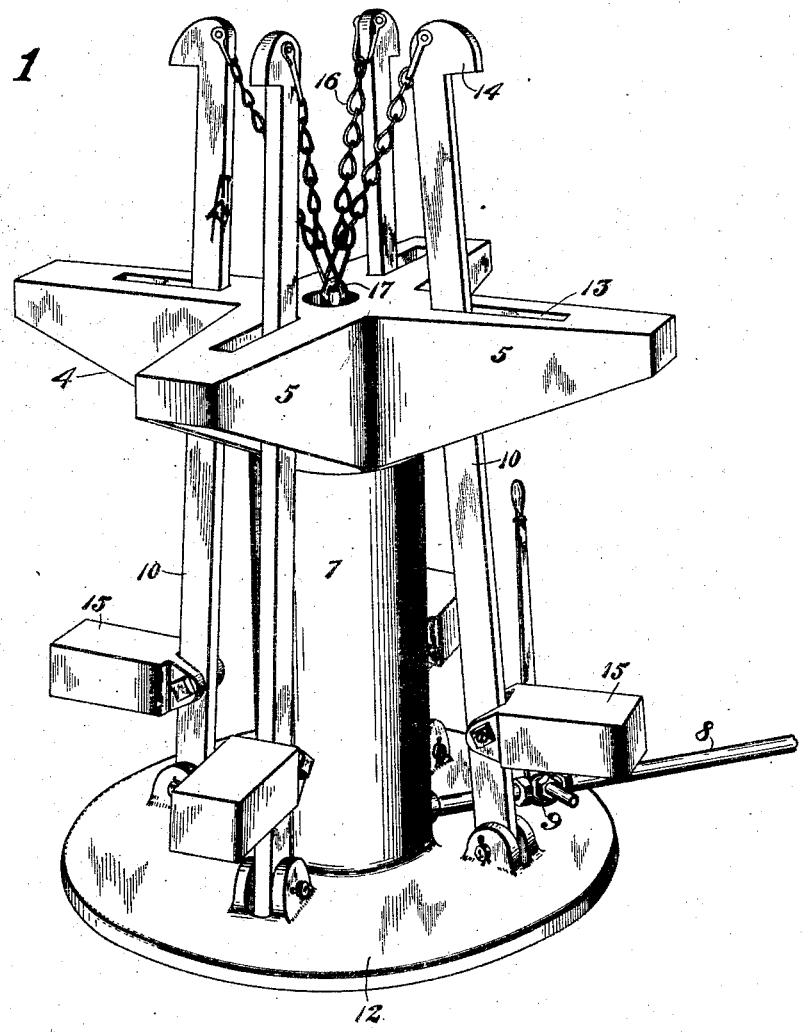

July 21, 1925.  A. ADAMSON  1,546,817
RIMMING PRESS
Filed April 8, 1922  2 Sheets-Sheet 1

Inventor
Alexander Adamson

July 21, 1925.
A. ADAMSON
RIMMING PRESS
Filed April 8, 1922
1,546,817
2 Sheets-Sheet 2
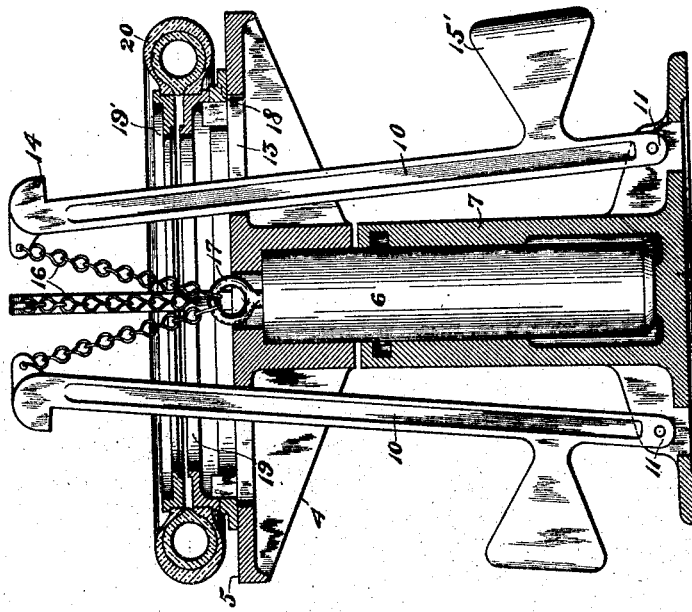
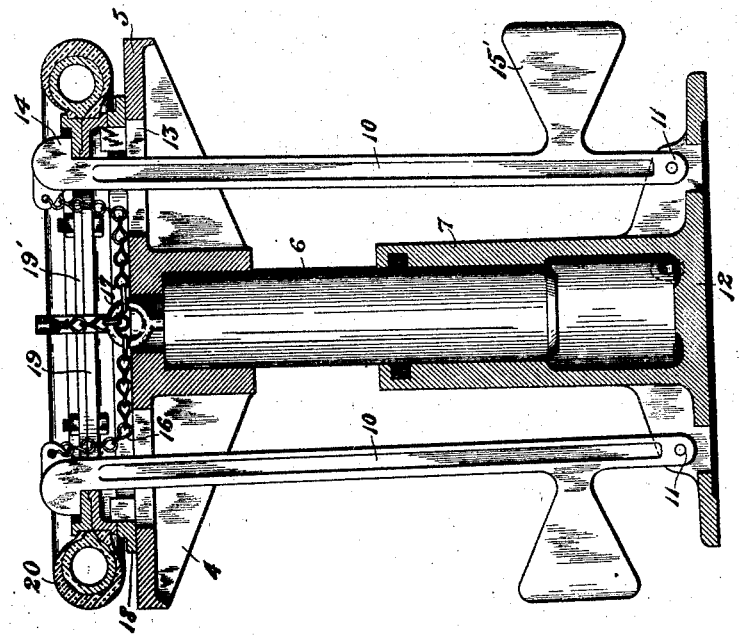
Inventor
Alexander Adamson Patented July 21, 1925.

1,546,817

UNITED STATES PATENT OFFICE.

ALEXANDER ADAMSON, OF AKRON, OHIO, ASSIGNOR TO THE ADAMSON MACHINE COMPANY, OF AKRON, OHIO, A CORPORATION OF OHIO.

RIMMING PRESS.

Application filed April 3, 1922. Serial No. 550,810.

*To all whom it may concern:*

Be it known that I, ALEXANDER ADAMSON, a citizen of the United States, residing at Akron, in the county of Summit and State of Ohio, have invented certain new and useful Improvements in Rimming Presses, of which the following is a specification.

The invention relates to a press for temporarily clamping together the rim rings used in the manufacture of cord tires for entering and tightening or loosening and removing the clamping bolts, and the object of the improvement is to provide a press which will automatically operate for clamping rings of various sizes.

When a cord tire is built upon an ordinary core and transferred to a resilient core, commonly called an air bag, the beads of the tire stand slightly apart and must be clamped together between rim rings, which in turn must be bolted together before the tire can be placed in a mold for the vulcanizing process.

The present invention involves the use of a crossarm table resting on the upper end of an elevator stem, and swinging arms extending upward through radial slots in the table arms with hooks on their upper ends and counterweights on their lower ends for swinging the arms outward to automatically engage and clamp the rim rings of a tire on the table when the same is elevated, and with flexible connections between the upper ends of the swinging arms and the centers of the table to pull the arms inward to clear the rings when the table is lowered.

The improvement may take the form of the press illustrated in the accompanying drawings, forming part hereof, in which—

Figure 1 is a perspective view of the improved rim press;

Fig. 2, an elevation section of the same through one of the cross arms in position for operation, showing a modified form of swinging arms; and Fig. 3, a similar view in pressing position.

Similar numerals refer to similar parts throughout the drawings.

The table 4 comprises a plurality of radial arms 5, which may be in the form of a cross, and the same is mounted upon the upper end of an elevator stem 6, which may be the plunger or ram of a cylinder 7 operated by compressed air or water received through a pipe 8 and controlled by a three-way valve 9.

The swinging arms 10 may be pivotally connected at the lower ends 11 to the base 12 of the cylinder, whence they extend upward through radial slots 13 in the cross arms of the table and are provided with outturned square shoulders or hooks 14 for engaging over the inner side of rim rings resting on the table. Each swinging arm is provided with a counterweight 15 and 15' extending outward at or near its lower end and overhanging its pivotal bearing, so as to swing the arms outward to or toward the outer ends of the radial slots in the table.

The upper end of each swinging arm is provided with a flexible or contractile connection with the center of the table, which may take the form of a chain 16 connected with an eye 17 secured to the upper end of the table or its stem; and the parts are so proportioned and arranged that when the table is depressed in normal or inoperative position, the chains are pulled downward and draw the upper ends of the hooked arms inward against the inner ends of the radial slots in the arms of the table, as shown in Figs. 1 and 2. When, however, the table is elevated, the tension on the chains is relaxed and the counterweights 15 automatically swing the arms outward.

In use, a supporting ring 18 may be placed upon the table on which the lower rim ring 19, the tire 20, and the upper rim ring 19' are assembled around the swinging arms; which is done when the table is in normal depressed position with the arms drawn inward, as shown in Fig. 2. The table is then elevated by a proper operation of the air or water valve, and as it rises the lower ends of the chains are carried upward and releases or relaxes their tension and the counterweights automatically swing the clamping arms outward against the inner edges of the rim rings, so that the hooks thereon will engage the upper ring and clamp the rings together, as shown in Fig. 3; whereupon the clamping bolts may be readily inserted and tightened in the spaces between the swinging arms.

It is not necessary to center the rim rings upon the table, for the reason that each swinging arm operates independently of the other, and is free to swing outward against the inner edges of the rings in any position within the limits of the radial slots in the table arms. For this reason the clamping rings may be located in any position on the table, within the limits of radial slots therein without affecting the operation of the press; in which the several oscillating arms are automatically and yieldingly urged outward by the respective counterweights when the table is raised, and are automatically and positively drawn inward by the connecting chains when the table is lowered.

I claim:

A press for tire rim rings and the like including a cross arm table, radial slots in the cross arms, radially oscillating arms pivoted below the table and extending through the slots to above the table, outturned hooks on the oscillating arms above the table, counterweights on the oscillating arms below the table urging the arms outward, and chains connecting the upper ends of the oscillating arms when the centers of the table is lowered.

ALEXANDER ADAMSON.